United States Patent Office 3,492,080
Patented Jan. 27, 1970

3,492,080
REACTION OF POLYMERIC MATERIALS CONTAINING REACTIVE HYDROGEN WITH MONOFUNCTIONAL BETA-OXYETHYL SULFONES
Giuliana C. Tesoro, Dobbs Ferry, N.Y., assignor to J. P. Stevens & Co., Inc., New York, N.Y., a corporation of Delaware
No Drawing. Filed June 12, 1962, Ser. No. 201,786
Int. Cl. D06m 9/00
U.S. Cl. 8—115.7                   20 Claims

ABSTRACT OF THE DISCLOSURE

Chemical modification of polymeric materials containing active hydrogens present as hydroxy groups with mono-functional beta-oxyethyl sulfones corresponding to the formula $$RSO_2CHCH_2OR_2$$
$$\overset{|}{R_1}$$

wherein R represents a monovalent organic radical which is stable to alkali and free of hydrogen atoms more reactive than the hydroxyl groups of the polymer and free of groups which are reactive with the hydroxyl groups of the polymer;
$R_1$ is selected from the group consisting of hydrogen and alkyl; and
$R_2$ is selected from the group consisting of hydrogen, alkyl and acyl radicals of lower aliphatic carboxylic acids.

---

The present invention relates to novel processes for chemically modifying active hydrogen containing materials to impart certain desirable characteristics thereto.

Still more particularly, this invention relates to the chemical modification of cellulosic textile materials with the above mono-functional beta-oxyethyl sulfones, whereby the textile materials are modified to impart certain desirable characteristics and properties thereto which are retained by the materials after repeated launderings, and result in increasing their applicability for diversified purposes.

The expression "active hydrogen containing material" as used herein means "active hydrogen" as determined by the Zerevitinow method; see Noller: Textbook of Organic Chemistry, W. B. Saunders Co., Phila., 1953, p. 87.

The cellulosic textile materials have in the past enjoyed a large measure of success because of their inherent strength and durability as well as their attractive price situation. However, with the advent of the large varieties of specialized synthetic polymeric materials, e.g. polyesters, acrylics, polysiloxanes, it has become more apparent that while the cellulosics possess properties sufficient for ordinary purposes, they have a number of shortcomings when compared to the newer synthetic polymers which detracts from their commercial acceptability. Indeed, it is these shortcomings of the cellulosics group which has spurred much of the growth and development of the newer synthetics, particularly in the field of textiles. In order for cellulosic materials to compete more successfully with the newer synthetic polymers in the area of textiles, methods of improving the properties of the cellulosic materials have been sought.

In the past, the modification of active hydrogen containing polymeric materials wherein the active hydrogen is present as hydroxy groups, referred to herein as "hydroxylated" polymers, has been the subject of extensive investigation and research, particularly in connection with cellulosic materials and textiles produced therefrom such as, for example, cotton and regenerated cellulose textiles.

The object of the research in this field has been to develop a method of treating these active hydrogen containing polymeric materials so as to produce a product with improved properties at lower cost. Many processes have been described in the past involving the treatment of hydroxylated polymeric materials which have sought to attain this object. However, because of inherent serious disadvantages which limit their commercial usefulness and applicability, none of the known processes provide a satisfactory way to chemically modify these polymers.

For example, it is known to treat active hydrogen containing polymeric materials wherein the active hydrogen is present in the form of hydroxy groups with mono-vinyl sulfones of the formula:

$$CH_2=CHSO_2R$$

wherein R is an alkyl radical; see U.S. Pat. 2,539,709. This process has a number of disadvantages, however, which makes it commercially unattractive. Because these mono-vinyl sulfones are generally toxic and act as vesicants and lachrimators, they are difficult to handle and therefore methods of treating said polymeric materials with these compounds possess concomitant disadvantages. In addition, these mono-vinyl sulfones have a poor solubility in water and water miscible solvents and as a consequence, may require the use of organic solvents which are generally more costly and many times hazardous because of their flammability properties. Furthermore, mono-vinyl sulfones have poor stability in the presence of alkaline compounds, and are relatively high in costs, all of which detract from their wide acceptability.

Accordingly, it is an object of this invention to provide a process for chemically modifying active hydrogen containing materials to impart desirable characteristics and properties thereto without the concomitant disadvantages of the known processes.

It is a further object of this invention, to provide a process for chemically modifying active hydrogen containing polymeric materials wherein the active hydrogen is present as hydroxyl groups to impart desirable characteristics and properties thereto without the disadvantages associated with the processes known in the art.

It is a further object of this invention to provide a process for imparting to hydroxylated polymeric materials certain specific properties which will result in more diversified utilization for said polymeric materials and will enable their use in areas heretofore limited to only the specialized synthetic polymers.

It is further object of this invention to provide a process for chemically modifying cellulosic textile materials in order to impart desirable characteristics thereto which are retained by the materials after repeated launderings.

It is a further object of this invention to provide a process for chemically modifying active hydrogen containing polymeric materials which avoids the use of hazardous reagents while maintaining reactivity and functionality and without requiring exacting control of processing condition.

Further objects of this invention will be apparent from the description which follows.

It has now been discovered that these objects may be attained and desirable characteristics and properties may be imparted to active hydrogen containing materials, particularly polymeric materials where the active hydrogen is present in the form of hydroxy groups by chemically modifying the active hydrogen containing compound with a mono-functional beta-oxyethyl sulfone in the presence of an alkaline catalyst.

The beta-oxyethyl sulfone reagents which are suitable for the processes of this invention are represented by the generic formula (I)  $RSO_2\underset{R_1}{CH}CH_2OR_2$ wherein R represents a mono-valent organic radical which is stable to alkali and free of hydrogen atoms which is more reactive than the hydroxy groups of the polymer and free of groups reactive with the hydroxy groups of the polymer. Examples of R are alkyl groups, substituted alkyl groups, aralkyl groups, substituted aralkyl groups, aryl groups, and substituted aryl groups; and $R_1$ is selected from the group consisting of hydrogen and alkyl and more particularly lower alkyl having from 1 to 6 carbon atoms; and $R_2$ is selected from the group consisting of hydrogen, alkyl groups containing from 1 to 6 carbon atoms and acyl radicals containing from 1 to 5 carbon atoms which are derived from carboxylic acids. Any compound falling within the scope of this formula may be used in carrying out the process of this invention. In all such compounds, however, the $RSO_2$ group must be in the beta position to the $OR_2$ group.

Among the beta-oxyethyl sulfones which can be employed in the process of the present invention are the following:

$C_2H_5SO_2CH_2CH_2OH$ $C_2H_5SO_2CH_2CH_2OCOCH_3$ $C_4H_9SO_2CH_2CH_2OCH_3$ $C_4H_9SO_2CH_2CH_2OH$ $C_2H_5SO_2\underset{CH_3}{CH}CH_2OH$ $C_{10}H_{21}SO_2CH_2CH_2OH$ $C_{18}H_{37}SO_2CH_2CH_2OCH_3$ $C_6H_5SO_2CH_2CH_2OH$ $C_6H_5SO_2CH_2CH_2OCOCH_3$ $ClC_6H_4SO_2CH_2CH_2OH$

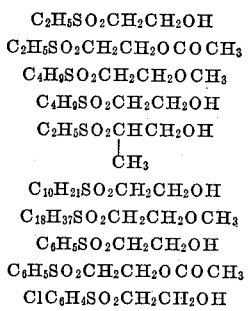

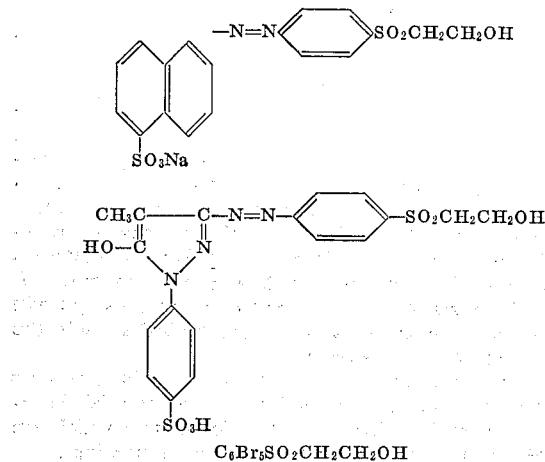

$C_6Br_5SO_2CH_2CH_2OH$ $C_6Cl_5SO_2CH_2CH_2OH$ and generally organic compounds characterized by the presence of the grouping $-SO_2CH_2CH_2OR_2$ The above list is only exemplary and is not considered to be limiting in any way.

Of particular interest are compounds wherein the monovalent organic radical R is an alkyl group containing from 1 to 18 carbon atoms, a halogen substituted alkyl wherein the alkyl has the aforesaid definition, phenyl groups, halogen substituted phenyl groups and azo dyestuff groups.

Further examples of R are: $C_6H_5CH_2-$ $CH_3C_6H_4CH_2-C_{12}H_{25}C_6H_4CH_2-, NO_2C_6H_4-$ and $ClC_6H_4$.

The monofunctional beta-oxyethyl sulfone reagents chemically react with the active hydrogen containing polymeric material so as to cause a change in the physical and chemical properties of the polymer. In the case of a hydroxylated polymer, the reaction which occurs in the presence of an alkaline catalyst may be represented schematically by the equation:

(1)

Polymer-OH + $RSO_2\underset{R_1}{CH}CH_2OR_2 \longrightarrow$

Polymer-$OCH_2\underset{R_1}{CH}SO_2R + R_2OH$ in which R, $R_1$ and $R_2$ have the meaning defined above. The chemical structure of the hydroxylated polymer is modified by this reaction, and the beta-oxyethyl sulfone reactant attaches the organic radical R to the hydroxylated polymer by means of chemical bonds. As a result the beneficial properties are retained by the polymer even after subsequent treatments and launderings.

The process of this invention is carried out by treating the active hydrogen containing polymeric material with the mono-functional beta-oxyethyl sulfone in the presence of an alkaline catalyst. The mono-functional beta-oxyethyl sulfone reagent may be in the form of a solution, dispersion, emulsion or paste, and it may be applied to the active hydrogen containing material by any conventional method such as dipping, spraying, coating, brushing or impregnating.

The solvent medium is not critical and any suitable solvent may be used. However, water is preferred as the solvent medium because of its low cost and availability, although organic solvents such as dimethyl formamide and mixtures of organic solvents and water can also be used. When the active hydrogen containing polymeric material is soluble in the solvent, it is most convenient to form a solution of the said polymeric material and intimately mix with it a solution of the sulfone reagent and a solution of the alkaline catalyst either simultaneously or in any sequence as is convenient. If the active hydrogen containing material is insoluble or in the form of a solid or a textile fabric the process may be carried out by first depositing the sulfone reagent solution on the fabric in a uniform manner by any conventional method and then applying an aqueous solution of the alkaline catalyst in a second step either with or without drying interposed between the two steps.

The sequence of steps employed in the process may be varied so that the solution of the sulfone reagent and the alkaline catalyst are applied simultaneously. Alternatively, the catalyst solution may be applied first and the sulfone solution last. After this treatment the reaction mixture may be dried and cured by heating for a period of time under conditions causing the elimination of the by-product $R_2OH$, which may be water, alcohol or a carboxylic acid depending on the nature of $R_2$ group.

The active hydrogen containing materials which can be employed in the process of this invention for the reaction with the mono-functional beta-hydroxyethyl sulfone are generally those containing a plurality of active hydrogens which are present in the form of hydroxy groups such as cellulose, starch, polyvinyl alcohol, dextrin and the like. Of particular interest are the cellulosic textile materials such as cotton collulose and regenerated cellulose. Recently, blends of cellulosic textile materials and other materials such as wool have become of particular importance. All these materials may be processed according to this invention when in the form of fibers, yarns, films or fabrics. The active hydrogen containing polymeric materials can be in the form of fiber forming solutions, e.g. viscose, and non-fiber forming solutions, as in the case of starch, hydroxyethyl cellulose and polyvinyl alcohol resins.

The alkaline catalysts useful for the processes of this invention are any non-volatile base or alkali which does not enter into chemical reaction with the beta-oxyethyl sulfones so as to destroy the functionality of the said sulfones and has a basic strength at least equivalent to sodium acetate. Generally included among the suitable alkaline materials are the acetates, oxides, hydroxides, carbonates, bicarbonates, phosphates and silicates of alkali metals. The carbonates and bicarbonates are preferred, because of their low cost, availability, and desirable solubility properties in addition to which is the fact that they do not impair the properties of those polymers which limited stability to alkali such as regenerated cellulose. Organic bases of equivalent strength may also be employed providing they are free of groups which react with the oxyethyl sulfonyl groups so as to destroy the capability of the reagent. Quaternary ammonium hydroxides and non-volatile tertiary amines are among the organic bases which can also be employed, but these are inherently more costly and therefore less desirable than the inorganic alkaline catalysts set forth above.

The concentration of catalysts required depends in part on the structure of the sulfone reagent. Whenever the reagent contains acidic groupings or forms acidic groupings in the course of reaction, the amount of base present during reaction should be sufficient to neutralize such acidic groups since for optimum results, the pH of the reacting system should be above about 8 at all times. With neutral reagents which do not yield acidic by-products, the amount of alkaline catalyst can be as low as 0.5% based on the weight of the active hydrogen containing material treated, although higher concentrations of catalysts generally tend to accelerate the reaction and therefore are preferred. The concentration of alkaline catalysts used can be varied from about 0.2% to about 20% based on the weight of the material treated. However, concentrations of about 1% to about 5% based on the weight of the active hydrogen containing material treated, are generally preferred since they are sufficient to assure rapid reaction rates without damaging even the alkali sensitive polymers such as regenerated cellulose fibers.

In addition to the alkaline catalyst, the solution which is employed to treat the active-hydrogen containing material may also contain inert salts such as sodium chloride, sodium sulfate and the like which are very often effective in preventing leaching of reagents previously deposited on the polymer and particularly useful in controlling the extent of the swelling of the fibers when treating textile materials. Various other conventional finishing and modifying agents may be added to the treating solution employed or to the catalyst system, the only limitation being the chemical compatibility of the system under the conditions selected for reaction.

The time and temperature conditions for heating necessary to achieve the desired reaction are somewhat dependent upon other reaction conditions. The time which is necessary to drive the reaction to substantial completion is not particularly critical and in addition to being a function of the temperature, the time depends on the concentration and nature of the alkaline catalyst used, on the structure of the sulfone reagent and in the case of textile treatment, on the extent of swelling. Whenever higher concentrations of alkaline catalysts are employed shorter reaction periods are sufficient. Thus, reaction times may vary from as little as two seconds to as long as about twenty-four hours. Excellent results can be obtained by heating for a period of several minutes at temperatures between about 200° F. and about 400° F. Shorter reaction times being sufficient at higher temperatures and higher concentrations and longer times required at lower temperatures and lower concentrations.

After the reaction is substantially complete, it may be desirable to carry out a washing step in order to remove residual unreactive material and catalysts. This washing operation can be accomplished by any conventional method and can include additional steps such as neutralization, bleaching and other steps commonly associated therewith.

Depending upon the beta-oxyethyl sulfone reagent utilized, the active hydrogen containing polymeric materials can be chemically modified so as to possess a variety of improved properties and characteristics. The process of this invention provides an excellent and economic method for introducing specific organic groups into active hydrogen containing polymeric materials, particularly hydroxylated polymers, whereby the physico-chemical properties of the polymer are permanently modified in a desirable manner. These improved properties and characteristics are "built" into the polymer by attaching specific organic radicals to the hydroxylated polymers by chemical bonds. Of particular interest and importance is the modification of textile materials with mono-functional beta-oxyethyl sulfone reagents by means of which specific desirable functional properties may be imparted to textiles in an efficient and economical manner. For example, when R is a hydrophobic radical such as $C_nH_{2n+1}$ in which $n>8$, the water resistance of the polymer is increased, water repellent properties can be imparted and permanent lubrication of the fibers can be achieved; when the sulfone contains a dye stuff molecule such as

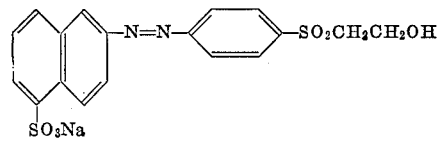

reaction with the beta-oxyethyl sulfone reagent yields a highly colored fiber in which the dye stuff molecule is permanently attached by chemical bonds to the fiber substrate.

As a further example of the chemical modification of polymers, when the sulfone contains a halogenated organic radical, the flame resistance of the hydroxylated polymer is enhanced. In addition, the solubility properties of the polymer can be modified in a desirable manner by reaction with the sulfones of the present invention and it is possible to increase or decrease, the tendency of the polymer to swell in water by suitable choice of the beta oxyethyl sulfone reagent.

The following examples illustrate the invention, all parts being by weight unless otherwise specified.

EXAMPLE I

A sample of bleached, desized cotton fabric is impregnated on a laboratory padder with an aqueous solution containing 60 grams per liter of potassium bicarbonate and 200 g. per liter of butyl hydroxyethl sulfone ($C_4H_9SO_2CH_2CH_2OH$). The wet pickup is 89%. The fabric sample is dried, cured in a forced draft oven for 3 minutes at 300° F. and washed. A weight increase of 6.4 is obtained on this fabric, which has acquired a desirable full hand.

EXAMPLE II

A sample of bleached desized cotton fabric is impregnated on a laboratory padder with an aqueous solution containing 3.5% $KHCO_3$, at 86% wet pickup (3.0% $KHCO_3$ deposited based on the weight of fabric), and dried. It is then padded at 95% wet pickup with a 17% solution of decyl hydroxythyl sulfone

in dimethyl formamide, dried, cured for 3 minutes at 300° F. and washed thoroughly. The weight increase obtained is 15.2%, indicating a yield of 80% in the reaction between cotton cellulose and the sulfone. The fabric is somewhat stiffened, and exhibits increased tear strength and abrasion resistance due to the presence of the hydrophobic substituent in the cellulose molecule. When the experiment is repeated with reduced concentrations of catalyst and reagent (1.5% and 8.5% respectively), the modified fabric retains its soft hand, with a comparable improvement in tear strength and abrasion resistance. The water uptake and water penetration of the cotton fabric are reduced significantly by the treatment.

EXAMPLE III

When the procedure of Example II is repeated using octadecyl hydroxyethyl sulfone ($C_{18}H_{37}SO_2CH_2CH_2OH$), the treated cotton fabric acquires excellent water repellent properties as well as increased resistance to tearing and abrasion. The chemical modification of cellulosic fabrics with octadecyl hydroxyethyl sulfone thus provides a novel, practical process for achieving water repellent properties which are durable to laundering and dry cleaning because of the chemical bonds created between the polymer and the sulfone.

EXAMPLE IV

A sample of rayon challis is impregnated on a laboratory padder with an aqueous solution containing 60 grams per liter of $KHCO_3$ and 200 grams per liter of butyl hydroxyethyl sulfone. The wet pickup is 85%. The fabric is dried, cured for 10 minutes at 300° F. and washed. A weight increase of 7.1% is obtained, and the tendency of the fabric to swell in water has been reduced by the chemical modification.

EXAMPLE V

A sample of rayon challis is padded with a 3.5% solution of $KHCO_3$ at 87% wet pickup and dried. It is then padded with a 17% solution of decyl hydroxyethyl sulfone in dimethyl formamide at 87% wet pickup, dried, cured for 3 minutes at 325° F. and washed. The weight increase due to treatment is 13.9%, and the somewhat stiffened fabric exhibits greatly increased resistance to swelling by water. A softer hand is obtained when the fabric is treated with reduced concentrations of catalyst and reagent in a similar manner without sacrificing improved properties of tear and abrasion resistance.

EXAMPLE VI

Samples of cotton fabric are treated by padding with aqueous solutions containing 200 g./liter ethyl sulfonyl ethanol ($C_2H_5SO_2CH_2CH_2OH$) and 75 g./liter of potassium bicarbonate, dried and cured under various conditons to achieve reaction, then washed thoroughly. The results obtained are as follows:

| Sample | Curing time in minutes & temp. | Weight increase, percent | Reaction yield |
|---|---|---|---|
| A | 10′ at 250° F | 7.8 | 45 |
| B | 2′ at 300° F | 7.6 | 43 |
| C | 5′ at 300° F | 5.6 | 32 |
| D | 2′ at 325° F | 3.9 | 22 |

These results show that a lower temperature of curing is more desirable for this particular reaction, probably due to the relatively high vapor pressure of the ethyl sulfonyl ethanol.

EXAMPLE VII

Samples of rayon challis are treated with ethyl sulfonyl ethanol by the procedure outlined for cotton in Example VI. Reaction yields of 50.5 to 64% are obtained, and the treated samples have excellent appearance.

EXAMPLE VIII

A sample of cotton fabric is impregnated with an aqueous solution containing 200 g. per liter of ethyl-beta-methoxyethyl sulfone ($C_2H_5SO_2CH_2CH_2OCH_3$) and 50 g. per liter of potassium bicarbonate, dried, cured for 10 minutes at 250° F. and washed. A modified fabric was obtained with desirable full hand characteristics which is a term of art meaning that it felt similar to more luxurious materials.

EXAMPLE IX

Samples of rayon and of mercerized cotton are padded with aqueous solutions containing 30 grams per liter of the red beta-hydroxyethyl sufonyl dyestuff of the formula and 10 grams per liter of potassium carbonate. The samples are then dried, and cured for 5 minutes at 325° F. Thereafter, the samples are washed thoroughly to remove catalyst and unreacted dye. As a result of the process, the modified are dyed a bright red shade which is fast to washing. The depth of shade is somewhat greater on the rayon than on the mercerized cotton fabric.

EXAMPLE X

The procedure of Example IX is repeated using 40 grams per liter of the yellow beta-hydroxyethyl sufonyl dyestuff of the formula and 15 g. per liter of potassium bicarbonate.

The fabric samples are thereby dyed a yellow shade which is fast to washing.

EXAMPLE XI 100 g. of a 13.5% aqueous solution of polyvinyl alcohol are thoroughly mixed with 2.43 g. (18% calculated on the dry weight of polyvinyl alcohol) of ethyl beta-hydroxyethyl sulfone ($C_2H_5SO_2CH_2CH_2OH$) dissolved in 5.0 g. of water, and with 0.88 g. of $KHCO_3$ dissolved in 4.0 g. of water. The viscous mixture obtained is spread on a glass plate, dried at 160° F. and cured for 10′ (minutes) at 300° F. in a forced draft oven. After curing, the polymer is removed from the glass plate, washed in cold water and dried. The modified polyvinyl alcohol polymer contains 2.44% sulfur. As a result of the modification the polymer is insoluble in cold water, but soluble in boiling water. A control sample prepared in identical manner without addition of the beta-hydroxyethyl sulfone reagent, contains no sulfur and is completely soluble in cold water.

EXAMPLE XII 100 g. of a 12.0% aqueous solution of polyvinyl alcohol are thoroughly mixed with 1.08 g. (9.0% calculated on the dry weight of polyvinyl alcohol) of decyl beta-hydroxyethyl sulfone ($C_{10}H_{21}SO_2CH_2CH_2OH$) dissolved in 5.0 g. dimethylformamide and with 0.19 g. of $KHCO_3$ dissolved in 1.0 ml. of water.

The mixture is spread on a glass plate, dried and cured. After removal from the glass plate it is washed as described in Example XI. The cured modified polymer is completely insoluble in cold water, and only partially soluble in boiling water. When the amount of reagent employed for the modification is increased to 15%, a larger number of substituents is introduced into the polymer, and the modified polymer is completely insoluble in water even at the boil.

EXAMPLE XIII 100 g. of a 20.0% aqueous solution of soluble starch are thoroughly mixed with 3.6 g. (18% calculated on the dry weight of starch) of ethyl-beta-hydroxyethyl sulfone dissolved in 7.0 ml. water and with 1.3 g. of $KHCO_3$ dissolved in 5.0 ml. water.

The mixture is spread on a glass plate, dried and cured as described in Example XI. The modified starch contains 3.0% sulfur.

EXAMPLE XIV 100 g. of a 24.0% aqueous solution of soluble starch are thoroughly mixed with 4.3 g. (18% calcd. on the dry weight of starch) of decyl-beta-hydroxyethyl sulfone dissolved in 10.0 g. of dimethylformamide and with 0.76 g. of $KHCO_3$ dissolved in 3.0 ml. of water.

The mixture is spread on a glass plate, dried at 160° F. and cured for ten minutes at 300° F. in a forced draft oven. Following curing, the polymer is removed from the glass plate, washed in cold water and dried. This process yielded a modified starch which exhibits greatly reduced solubility in water when compared with unmodified starch.

EXAMPLE XV

In this example, 100 grams of a 20.0% aqueous solution of soluble hydroxy-ethyl cellulose are thoroughly mixed with 3.6 grams of ethyl-beta hydroxyethyl sulfone dissolved in 7.0 ml. of water and with 1.3 grams of $KHCO_3$ dissolved in 5.0 ml. of water.

The mixture is spread on a glass plate, dried at 160° F. and cured for 10 minutes at 300° F. in a forced draft oven. The polymer is stripped from the glass plate after it is completely dry and washed in cold water to remove residual catalyst. The modified polymer is insoluble in cold water.

EXAMPLE XVI 100 grams of a 24.0% aqueous solution of soluble hydroxy ethyl cellulose are thoroughly mixed with 4.3 grams of decyl-beta-hydroxyethyl sulfone dissolved in 10.0 g. of dimethyl formamide and with 0.76 g. of $KHCO_3$ dissolved in 3.0 ml. of water.

The mixture is spread on a glass plate, dried at 160° F. and cured for 10 minutes at 300° F. in a forced draft oven. After curing, the polymer is removed from the glass plate, washed and dried. The modified hydroxy ethyl cellulose exhibits greatly reduced solubility in cold water when compared with the unmodified polymer.

In the foregoing discussion and examples, emphasis has been placed on the features of this invention which have particular usefulness for the chemical modification of textile materials, particularly fabrics of cellulosic materials. It must be understood, however, that our novel processes can also be usefully applied to fabrics containing blends of celluosic fibers with non-cellulosic fibers.

Furthermore, the present invention is not limited to polymers capable of forming textile structures but is equally applicable to other polymeric materials containing active hydrogens such as polyvinyl alcohol, starch and hydroxy ethyl cellulose and the like. These polymers are widely known as sizing agents for textile materials. In accordance with the processes of this invention it is possible to treat the sizing material with the beta-oxyethyl sulfone reagent in order to obtain a chemically modified sizing material which is then utilized in sizing textile materials. Fabrics treated with the chemcally modified size are thereby further improved. By the same manner it is possible to simultaneously treat the textile material with the beta-oxyethyl sulfone reagent and a sizing material.

It is understood that various other modifications will be apparent to those skilled in the art without departing from the scope and spirit of this invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which this invention pertains.

What is claimed is:

1. A process for chemically modifying an active hydrogen containing polymer which comprises reacting in the presence of an alkaline catalyst said polymer with a monofunctional beta-oxyethyl sulfone corresponding to the formula:

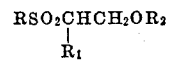

wherein R is a monovalent organic radical selected from the group consisting of alkyl groups from 1 to 18 carbon atoms, halogen-substituted alkyl groups, phenyl, halogen-substituted phenyl, $C_6H_5CH_2$, $CH_3C_6H_4CH_2$,

and $NO_2C_6H_5$;

$R_1$ is a member selected from the group consisting of H and alkyl radicals; and $R_2$ is a member selected from the group consisting of H, alkyl groups, and acyl radicals of aliphatic monocarboxylic acids; whereby desirable characteristics are imparted to said polymer.

2. The process as defined in claim 1 wherein said polymeric material is polyvinyl alcohol.

3. The process as defined in claim 1 wherein said polymeric material is starch.

4. The process as defined in claim 1 wherein the concentration of the alkaline catalyst is from 0.2% to about 20% based on the weight of the polymer treated and the reaction occurs at a temperature of from about 200° F. to 400° F. for a period of time sufficient to complete the reaction.

5. The process as defined in claim 1 wherein said sulfone is $C_4H_9SO_2CH_2CH_2OH$.

6. The process as defined in claim 1 wherein said sulfone is $C_{10}H_{21}SO_2CH_2CH_2OH$.

7. The process as defined in claim 1 wherein said sulfone is $C_{18}H_{37}SO_2CH_2CH_2OCH_3$.

8. The process as defined in claim 1 wherein said sulfone is $C_2H_5SO_2CH_2CH_2OH$.

9. The process as defined in claim 1 wherein said sulfone is $C_2H_5SO_2CH_2CH_2OCOCH_3$.

10. The process as defined in claim 1 wherein said sulfone is $C_6H_5SO_2CH_2CH_2CH_2OH$.

11. The process as defined in claim 1 wherein said sulfone is $ClC_6H_4SO_2CH_2CH_2OH$.

12. The process as defined in claim 1 wherein said sulfone is $C_6Br_5SO_2CH_2CH_2OH$.

13. The process as defined in claim 1 wherein said sulfone is $C_6Cl_5SO_2CH_2CH_2OH$.

14. The process as defined in claim 1 wherein said sulfone is $C_6H_5SO_2CH_2CH_2OCOCH_3$.

15. A process for chemically modifying a fibrous polymeric material containing active hydrogen which comprises reacting in the presence of an alkaline catalyst said fibrous polymeric material with a mono-functional beta-oxyethyl sulfone corresponding to the formula:

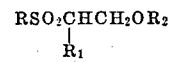

wherein R is a monovalent organic radical which is selected from the group consisting of alkyl groups from 1 to 18 carbon atoms, halogen-substituted alkyl groups, phenyl, halogen-substituted phenyl, $C_6H_5CH_2$, $CH_3C_6H_4CH_2$ $C_{12}H_{25}C_6H_4CH_2$, and $NO_2C_6H_5$;

$R_1$ is a member selected from the group consisting of H and alkyl radicals; and $R_2$ is a member selected from the group consisting of H, alkyl groups, and acyl radicals of aliphatic monocarboxylic acids; whereby desirable characteristics are imparted to the said fibrous polymeric material.

16. The process as defined in claim 15 wherein the fibrous polymeric material comprises a blend of celluosic fibers and wool fibers.

17. A process for chemically modifying fiber-forming polymeric material containing active hydrogen atoms which comprises reacting in the presence of an alkaline catalyst, said fiber-forming polymeric material with a mono-functional beta-oxyethyl sulfone of the formula:

$$RSO_2CHCH_2OR_2$$
$$|$$
$$R_1$$

wherein R is a monovalent organic radical which is selected from the group consisting of alkyl groups from 1 to 18 carbon atoms, halogen-substituted alkyl groups, phenyl, halogen-substituted phenyl, $C_6H_5CH_2$, $$CH_3C_6H_4CH_2$$

$C_{12}H_{25}C_6H_4CH_2$, and $NO_2C_6H_5$;

$R_1$ is a member selected from the group consisting of H and alkyl radicals; and $R_2$ is a member selected from the group consisting of H, alkyl groups, and acyl radicals of aliphatic mono-carboxylic acids; whereby desirable characteristics are imparted to said fiber forming polymeric material.

18. The process as defined in claim 17 wherein said fiber-forming polymeric material is viscose.

19. A process for chemically modifying a cellulosic material which comprises reacting said material in the presence of an alkaline catalyst with a mono-functional beta-oxyethyl sulfone corresponding to the formula:

$$RSO_2CHCH_2OR_2$$
$$|$$
$$R_1$$

wherein R is a monovalent organic radical group which is selected from the group consisting of alkyl groups from 1 to 18 carbon atoms, halogen-substituted alkyl groups, phenyl, halogen-substituted phenyl, $C_6H_5H_2$, $$CH_3C_6H_4CH_2$$

$C_{12}H_{25}C_6H_4CH_2$, and $NO_2C_6H_5$;

$R_1$ is a member selected from the group consisting of H and alkyl radicals; and $R_2$ is a member selected from the group consisting of H, alkyl groups, and acyl radicals of aliphatic mono-carboxylic acids; whereby desirable characteristics are imparted to the cellulosic material.

20. A product produced by the process of claim 16.

References Cited

UNITED STATES PATENTS

| | | | |
|---|---|---|---|
| 3,100,131 | 8/1964 | Freyermuth | 8—120 X |
| 3,178,250 | 4/1965 | Ellis et al. | 8—120 X |
| 3,218,118 | 11/1965 | Steele et al. | 8—116 |
| 3,222,119 | 12/1965 | Toshlick et al. | 8—116 |

OTHER REFERENCES

Borghetty et al., American Dyestuff Reporter, Feb. 4, 1963, pp. 34–37.

GEORGE F. LESMES, Primary Examiner

J. CANNON, Assistant Examiner

U.S. Cl. X.R.

8—115.5, 115.6, 120; 260—79.3, 91.3, 210, 231, 233.3